UNITED STATES PATENT OFFICE 2,108,938

INDIGOID DYESTUFFS

Eduard Kambli, Basel, Switzerland, assignor to Society of Chemical Industry in Basle, Basel, Switzerland No Drawing. Application July 3, 1936, Serial No. 88,895. In Switzerland July 15, 1935

4 Claims. (Cl. 260—49)

This invention relates to the manufacture of valuable indigoid dyestuffs by treating with a halogenating agent a dyestuff of the general formula

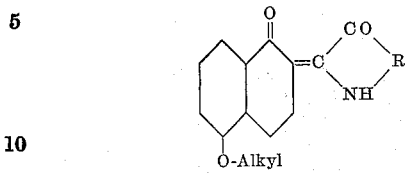

wherein R signifies an aryl radical.

The process may be so conducted that the production of the indigoid dyestuff of the above formula and its treatment with a halogenating agent constitute a single-stage operation.

The indigoid dyestuffs which are parent materials for the invention may be obtained, for example, by condensing a 5-alkoxy-1-hydroxynaphthalene, for instance 5-methoxy-1-hydroxynaphthalene or 5-ethoxy-1-hydroxynaphthalene, with a reactive isatin-α-compound, for instance of the benzene- or naphthalene- series. Such isatin-α-compounds are, for instance, the α-anilide, α-chloride and α-bromide of isatin and of naphthisatin, as well as derivatives thereof containing halogen, alkyl, aryl or alkoxy as substituents in the nucleus.

The halogenation may be conducted in presence of a solvent or a suspension agent, for instance benzene, chlorobenzene, nitrobenzene, tetrachlorethane or glacial acetic acid. As halogenating agents the halogens themselves, for instance, chlorine and bromine, may be used, and also suitable agents which yield halogen like sulfurylhalides. Moreover, the halogenation may occur in presence of a halogen carrier such as iodine, a halide of antimony or iron and their halogen compounds. Particularly good results in respect of yield are obtained when sulfurylchloride is used.

Dyestuffs obtained by the invention dye vegetable and animal fiber, for instance cotton, wool natural or artificial silk, for example artificial silk from regenerated cellulose blue to blue-green tints of good fastness and of good color by artificial light. They are particularly suitable for use in printing and may be converted by the usual methods into leuco-ester salts.

The following examples illustrate the invention, the parts being by weight:—

Example 1

To a suspension of 35.1 parts of the dyestuff obtained by condensing in chlorobenzene 5-chloro-7-methylisatin-α-chloride with 5-methoxy-1-hydroxynaphthalene in 500 parts of chlorobenzene at 0–5° C. are added 15.8 parts of sulfurylchloride. In the course of ½ hour the temperature is raised to 60° C. and the mixture is stirred at this temperature and then heated for the purpose of finishing the chlorination for one hour at 115–120° C. After cooling, the dyestuff of the formula

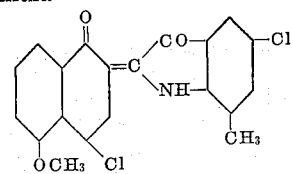

is isolated by filtration and washing with chlorobenzene and alcohol in the form of a lustrous blue crystalline powder which dissolves in concentrated sulfuric acid to a blue-green solution and dyes cotton fast blue tints in a yellow vat.

Example 2

46.1 parts of the dyestuff made by condensing in chlorobenzene 5:7 - dibromisatin - α - chloride with 5-methoxy-1-hydroxynaphthalene are suspended in 500 parts of chlorobenzene, and while stirring at 0–5° C. 15.8 parts of sulfurylchloride are added. When the addition is complete, the temperature is raised within an hour to about 60° C. and stirring is continued at this temperature for 1 hour, and then for the purpose of finishing the chlorination the whole is further heated for 1 hour at 115–120° C. The dyestuff of the formula

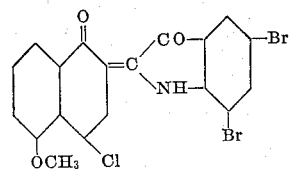

is filtered after the mixture has been cooled to about 20° C. and is then washed with chlorobenzene and in alcohol. It is a dark blue powder soluble in concentrated sulfuric acid to a blue solution and dyeing cotton in a yellow vat grey-blue tints.

Example 3

41 parts of the dyestuff obtained by condensing in chloro-benzene 4:7-dimethyl-5-bromisatin-α-chloride with 5-methoxy-1-hydroxynaphthalene are suspended in 500 parts of chlorobenzene at 0–5° C. and 2 parts of antimony pentachloride and 15.8 parts of sulfurylchloride are added. When the temperature is raised to about 60° C. within 1 hour, chlorination begins with evolution of sulfur-dioxide and hydrogen chloride. By stirring for 1 hour at 60° C. and heating for 1 hour to 115–120° C. the process is completed. After cooling, filtering and washing the dyestuff of the formula

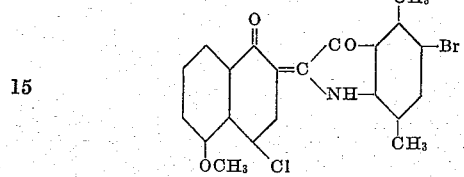

with chlorobenzene and with alcohol, there is obtained a dark blue powder which is soluble in concentrated sulfuric acid to a green solution and dyes cotton in a yellow vat fast greenish-blue tints.

If bromine is used instead of sulfurylchloride as the halogenating agent, there is obtained a dyestuff of similar properties.

*Example 4*

34.7 parts of the dyestuff obtained by condensing in benzene 4-methyl-7-methoxyisatin-α-chloride with 5-methoxy-1-hydroxynaphthalene are suspended in 500 parts of chlorobenzene and mixed while stirring at 0–5° C. with 2 parts of antimony pentachloride and 31.6 parts of sulfuryl chloride. The chlorination, which begins when the mass is gradually heated to about 50° C., is completed by stirring for 1 hour at about 60° C. and thereupon for another hour at 115–120° C. After cooling, the dyestuff of the formula

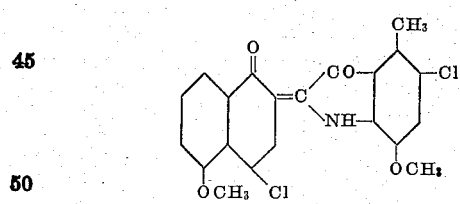

is separated by filtration and washing with chlorobenzene and with alcohol in the form of a blue powder which dissolves in concentrated sulfuric acid to a green solution and dyes cotton in an orange-yellow vat blue-green tints of good color by artificial light. When printed on cotton the dyestuff yields a similar tint.

*Example 5*

38.3 parts of the dyestuff obtainable by condensing in benzene 4-methyl-5-chloro-7-methoxyisatin-α-chloride with 5-methoxy-1-hydroxynaphthalene are suspended in 800 parts of chlorobenzene and the suspension is mixed with a solution of 14.3 parts of sulfurylchloride in 50 parts of chlorobenzene. Chlorination begins when the temperature is raised to about 60° C. in the course of 1 hour, sulfur-dioxide and hydrogen chloride being evolved. By continuing the heating for 1 hour at the same temperature and then heating for an hour at 115–120° C., the reaction is completed. After cooling, the dyestuff of the formula

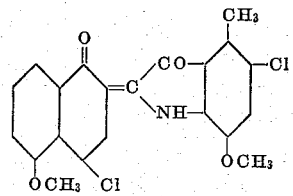

is filtered and washed with chlorobenzene and with alcohol, whereby it is obtained in the form of a blue powder soluble in concentrated sulfuric acid to a green solution and dyeing cotton in an orange-yellow vat blue-green fast tints of good color by artificial light. A similar tint is obtained when the dyestuff is used for printing cotton.

*Example 6*

38.1 parts of the dyestuff obtainable by condensing in benzene 4-methyl-5-chloro-7-methoxyisatin-α-chloride and 5-methoxy-1-hydroxynaphthalene are suspended in 700 parts of chlorobenzene at 120° C. and the suspension is chlorinated by running in gradually a solution of 14.3 parts of sulfurylchloride in 40 parts of chlorobenzene. To finish the chlorination the mixture is stirred for 1 hour at 120–125° C. After cooling, the dyestuff is filtered and washed with chlorobenzene and alcohol. It is a pure greenish-blue powder which in dyeing and printing yields the same tints as are obtained with the dyestuff produced as described in Example 5.

What I claim is:—

1. Indigoid dyestuffs of the general formula

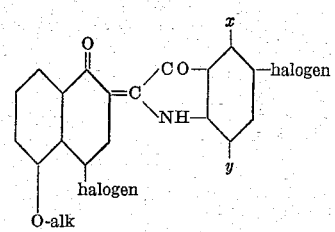

wherein alk represents a radical of the lower aliphatic series, $x$ a member of the group consisting of hydrogen and methyl, and $y$ a member of the group consisting of methyl, methoxy and halogen, which dyestuffs are blue powders yielding in cotton printing blue to blue-green tints of excellent fastness.

2. Indigoid dyestuffs of the general formula

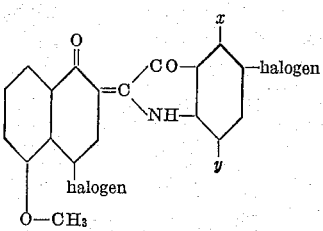

wherein $x$ represents a member of the group consisting of hydrogen and methyl and $y$ a member of the group consisting of methyl, methoxy and halogen, which dyestuffs are blue powders yielding in cotton printing blue to blue-green tints of excellent fastness.

3. Indigoid dyestuffs of the general formula

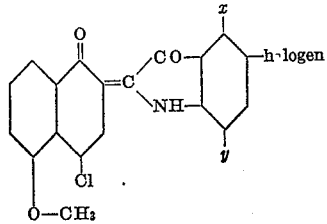

wherein $x$ represents a member of the group consisting of hydrogen and methyl and $y$ a member of the group consisting of methyl, methoxy and halogen, which dyestuffs are blue powders yielding in cotton printing blue to blue-green tints of excellent fastness.

4. The indigoid dyestuff of the formula

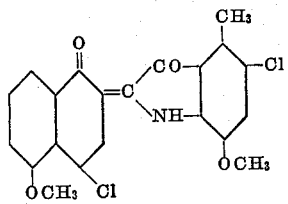

which dyestuff is a blue powder yielding in cotton printing blue-green tints of excellent fastness.

EDUARD KAMBLI.